US008015284B1

(12) United States Patent
Isenberg et al.

(10) Patent No.: US 8,015,284 B1
(45) Date of Patent: Sep. 6, 2011

(54) DISCERNING USE OF SIGNATURES BY THIRD PARTY VENDORS

(75) Inventors: Henri Isenberg, Los Angeles, CA (US); Mark Kennedy, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 241 days.

(21) Appl. No.: 12/510,967

(22) Filed: Jul. 28, 2009

(51) Int. Cl.
*G06F 15/173* (2006.01)

(52) U.S. Cl. .......................................... 709/224; 726/32
(58) Field of Classification Search .................. 709/224; 726/26, 32; 705/51, 52, 57
See application file for complete search history.

(56) References Cited

U.S. PATENT DOCUMENTS

| 7,721,333 | B2* | 5/2010 | Horne | 726/22 |
| 2004/0111632 | A1* | 6/2004 | Halperin | 713/200 |
| 2007/0056035 | A1* | 3/2007 | Copley | 726/22 |
| 2007/0180509 | A1* | 8/2007 | Swartz et al. | 726/9 |
| 2007/0260643 | A1* | 11/2007 | Borden et al. | 707/201 |
| 2007/0276823 | A1* | 11/2007 | Borden et al. | 707/5 |
| 2009/0241173 | A1* | 9/2009 | Troyansky | 726/5 |
| 2009/0241187 | A1* | 9/2009 | Troyansky | 726/22 |
| 2009/0241191 | A1* | 9/2009 | Keromytis et al. | 726/23 |
| 2009/0241196 | A1* | 9/2009 | Troyansky et al. | 726/25 |
| 2009/0328216 | A1* | 12/2009 | Rafalovich et al. | 726/23 |

OTHER PUBLICATIONS

Schorreck, Henry F., "Battle of Midway, Jun. 4-7, 1942: The Role of COMINT in the Battle of Midway (SRH-230)", Naval History and Heritage Command, http://www.history.navy.mil/faqs/faq81-3.htm.*

* cited by examiner

*Primary Examiner* — Douglas B Blair
(74) *Attorney, Agent, or Firm* — Fenwick & West LLP

(57) ABSTRACT

Bait files and signatures allow security software vendors to track both authorized and unauthorized usage of the security vendor's signatures/products by third party security vendors. A bait file providing module anonymously provides a bait file to a third party security vendor for security detection, where the bait file is a non-malware file. A signature providing module provides a bait signature corresponding to the bait file that is included in a signature database which is made publicly available. A scanner monitoring module monitors security detections made over a period of time by a security scanner operated by the third party vendor. A determination module determines whether the scanner positively detected the bait file following the release of the bait signature for the bait file. A use detection module detects, in response to a positive determination, that the third party vendor used the bait signature provided to detect the bait file.

20 Claims, 6 Drawing Sheets

DISCERNING USE OF SIGNATURES BY THIRD PARTY VENDORS

BACKGROUND OF THE INVENTION

1. Field of the Invention

This invention pertains in general to computer security, and more specifically to detecting and monitoring a third party security product vendor's use of another vendor's signatures.

2. Description of the Related Art

Many types of security software use signature-based detection of malware (e.g., viruses, worms, spyware, crimeware, Trojan horses, etc.) that employs known malicious patterns or fingerprints to uniquely identify the malware. Security software can scan and compare computer files against a database of known malware signatures to identify matches that indicate that the file is likely infected. Similarly, signatures for files that are known to be clean or non-malware files can be used to identify that a file is not a malware threat. Signatures for detecting malware or for detecting non-malware are commonly identified or developed by security software companies. Due to the continually growing number of software programs available today and the constant new advances in malware, a great deal of work goes into identifying valid signatures. Each security software company typically has a collection of its own in-house developed signatures for use in its security products, which provides a significant advantage to the company.

Given all of the work committed by each security software vendor in developing their sets of signatures, it is advantageous to prevent theft of the signatures or scanning products. Yet, the difficulty of preventing theft of their signatures by other companies is a growing problem. Cloud computing, in which virtualized resources are provided via a server over the Internet, is becoming more and more ubiquitous, and so many companies now employ cloud-scanning or cloud security technology. As cloud-scanning technology for malware becomes more prevalent, many software vendors can "hide behind the cloud" and usurp any number of their competitor's scanning technologies. These companies can use their competitor's technologies to augment their own or even replace their own detection technologies. As one example, some companies provide what is known as "fake AV" software that purports to be security software, but is really just adware or some other non-security product that utilizes the technologies of a valid security company as its own. Currently, there is no way to readily detect blatant stealing of a security vendor's products or signatures and prevent others from benefitting from the vendor's hard work.

In some cases, security software vendors license their technologies for use by other companies. Even with this authorized use of the vendor's products, there comes some risk. If the licensee is not regularly updating the products with the newest signatures provided by the vendor or is otherwise improperly using the products, the vendor's brand name can be damaged. Currently, there is no way for the security vendor to readily monitor even authorized usage of its signatures to ensure that the signatures are being properly used and updated regularly.

Therefore, there is a need in the art for a solution that permits detecting the use, whether improper or proper, of one security software vendor's signatures/products by another vendor.

DISCLOSURE OF INVENTION

The above and other needs are met by a computer-implemented method, computer system, and computer program product or computer-readable storage medium in which a security module detects use of a security vendor's signatures by third party security vendors. An embodiment of the method comprises anonymously providing a bait file to a third party security vendor for security detection, where the bait file is a non-malware file. The method further comprises providing a bait signature corresponding to the bait file that is included in a signature database of the security vendor which is made publicly available. In addition, the method comprises monitoring security detections made over a period of time by a security scanner operated by the third party security vendor. The method further includes determining whether the scanner operated by the third party security vendor positively detected the bait file following the release of the bait signature for the bait file. Also, the method includes detecting that the third party security vendor used the bait signature provided to detect the bait file responsive to a positive determination.

In an embodiment of the system, a bait file providing module anonymously provides a bait file to a third party security vendor for security detection, the bait file being a non-malware file. A signature providing module provides a bait signature corresponding to the bait file that is included in a signature database of the security vendor which is made publicly available. A scanner monitoring module monitors security detections made over a period of time by a security scanner operated by the third party security vendor. A determination module determines whether the scanner operated by the third party security vendor positively detected the bait file following the release of the bait signature for the bait file. A use detection module detects that the third party security vendor used the bait signature provided to detect the bait file in response to a positive determination by the determination module.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
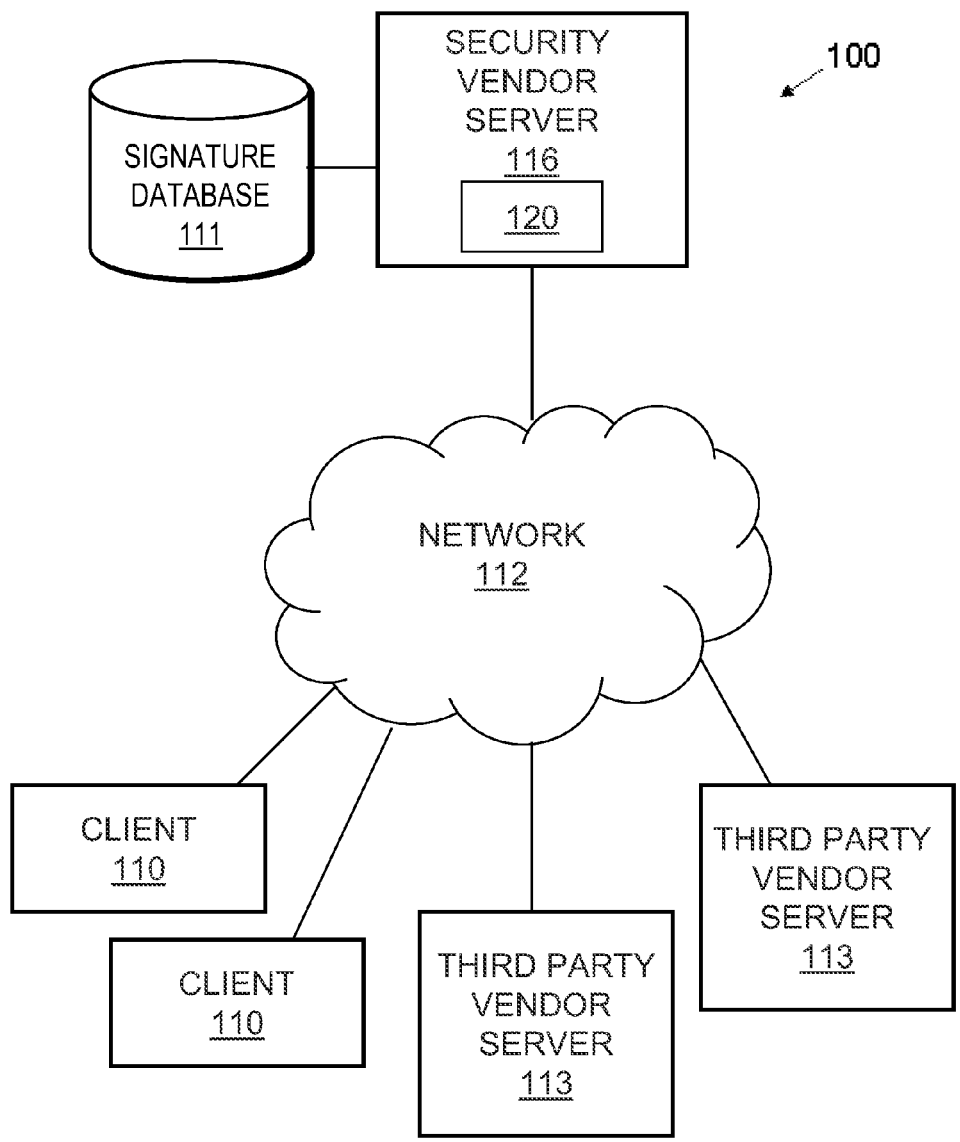
FIG. 1 is a high-level block diagram illustrating an example of a computing environment 100, according to one embodiment of the present invention.

FIG. 1 is a high-level block diagram illustrating a computing environment 100 according to an embodiment. FIG. 1 illustrates a security vendor server 116, third party vendor servers 113, and clients 110 connected by a network 112. Only two third party vendor servers 113 and only two clients 110 are shown in FIG. 1 in order to simplify and clarify the description. Embodiments of the computing environment 100 can have hundreds of third party vendor servers 113, thousands or even millions of clients 110, as well as multiple security vendor servers 116. In some embodiments, the clients 110 are only connected to the network 112 for a certain period of time or not at all.

The security vendor server 116 provides information to the third party vendor servers 113 via the network 112. The security vendor server 116 is operated by a vendor of security products. As used herein, the term "security vendor" refers to any provider of security products/software or security services, whether purchased for money or free. In one embodiment, the security vendor server 116 is located at a website provided by SYMANTEC CORPORATION, although the server can also be provided by another entity for which detection of use of their products/signatures would be useful. The server 116 can include a database storing signatures, such as signature database 111 and a web server for interacting with third party vendor servers 113 or clients 110. The security vendor server 116 can send information (e.g., signatures) stored in the database 111 across the network 112 to the third party vendor servers 113 or clients 110. For example, for discerning use of the security vendor's signatures by other vendors, the security vendor server can provide bait files to the third party vendor servers 113 via the network 112. The security vendor server 116 can also make publicly available certain signatures from signature database 111. One or more of the functions of the server 116 can also be executed in a cloud computing environment.

The third party vendor servers 113 are servers that can interact with the security vendor server 116 or other entities on the network 112. Like the security vendor server 116, third party vendor servers 113 are typically operated by a vendor of security products. As used herein, the term "third party vendor" or "third party security vendor" refers to any vendor that provides or purports to provide security management to a client 110 or to another entity, such as by providing security products/software or security services, whether purchased for money or free. The third party vendor servers 113 can include a database for storing information and a web server for interacting with security vendor server 116 or clients 110. The third party vendor servers 113 can send or receive information across the network 112 from/to the security vendor server 116 or clients 110. For example, the third party vendor servers 113 can receive the bait files provided by the security vendor server 116 via the network 112. The third party vendor servers 113 can also access signatures made publicly available by the security vendor server 116. One or more of the functions of the third party vendor servers 113 can also be executed in a cloud computing environment. For example, the third party vendor servers 113 can use cloud scanning technology, described above, in which virtualized resources are provided via a server over the Internet. When a server 113 using cloud scanning technology encounters a file to be scanned, the server 113 can send a portion of the file or a hash of the file to a service that is hosted by the server 113, which is then used to determine if the file is malicious. Using this type of cloud-scanning technology, the third party vendors can "hide behind the cloud" and utilize their competitor's scanning technologies and security signatures (e.g., those of the security vendor) to augment or even to replace their own technologies for security management.

The clients 110 are computers or other electronic devices used by one or more users that can interact with the server 116 or other clients 110. The clients 110, for example, can be personal computers executing a web browser that allows the user to browse and search for information available at a website associated with the server. In other embodiments, the clients 110 are network-capable devices other than a computer, such as a personal digital assistant (PDA), a mobile telephone, a pager, a television "set-top box," etc. The clients 110 preferably execute an operating system (e.g., LINUX®, one of the versions of MICROSOFT WINDOWS®, and PALM OS®), which controls the operation of the computer system, and execute one or more application programs. The clients 110 can perform activities and make requests for or otherwise acquire information (e.g., security software/products or services) from the security vendor server 116, third party vendor servers 113, or other computers. For example, where security software being executed on a client 110 detects a file that is potentially malicious, the client 110 can submit, via the network 112, the potentially malicious file for further analysis by security software vendors, such as those operating the security vendor server 116 or the third party vendor servers 113.

The network 112 enables communications among the entities connected to it. In one embodiment, the network 112 is the Internet and uses standard communications technologies and/or protocols. Thus, the network 112 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 112 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In the embodiment illustrated in FIG. 1, the security vendor server 116 executes a security module 120 for detecting use of the security vendor's signatures by third party security vendors. For example, the module 120 can be used for detecting use of the security vendor's signatures by a third party vendor using cloud scanning technology, which masks the third party vendor's usage of another vendor's products. As used herein, "detecting use of the security vendor's signatures" refers to detecting any use by a third party security vendor of security products/software or security signatures identified or developed by the security vendor. The security module 120 can be a discrete application program, or the module 120 can be integrated into another application program or the server's 116 operating system. In some embodiments, a portion of the security module 120 is executed on another entity connected to the network 112 or in a cloud computing environment. In one embodiment, the security module 120 is executed on the security vendor server 116 to perform detection of the use of the security vendor's signatures. However, in other embodiments, the security module 120 is executed on the security vendor server 116 for providing a signature-use detection service to other security software vendors.

In brief summary, the security module 120 can perform the detection of signature usage by providing a bait file to a third party security vendor (e.g., such as one that might operate one of the servers 113) for security detection, where the bait file is known by the security vendor to be a non-malware file. The module 120 can provide a bait signature corresponding to the bait file that is included in the security vendor's signature database 111, where the bait signature is made available to the third party vendor. The module 120 can then monitor security detections made over a period of time by the third party security vendor, and can determine whether the vendor detects the bait file following the release of the bait signature. Since the security vendor itself provided the non-malware bait file and bait signature, the third party vendor can only detect the bait file to be malware if it is using the security vendor's bait signature. Thus, if a detection is made, the third party vendor is likely using the security vendor's signatures in what may be an unauthorized usage. This is described in more detail below.

Figure 2:
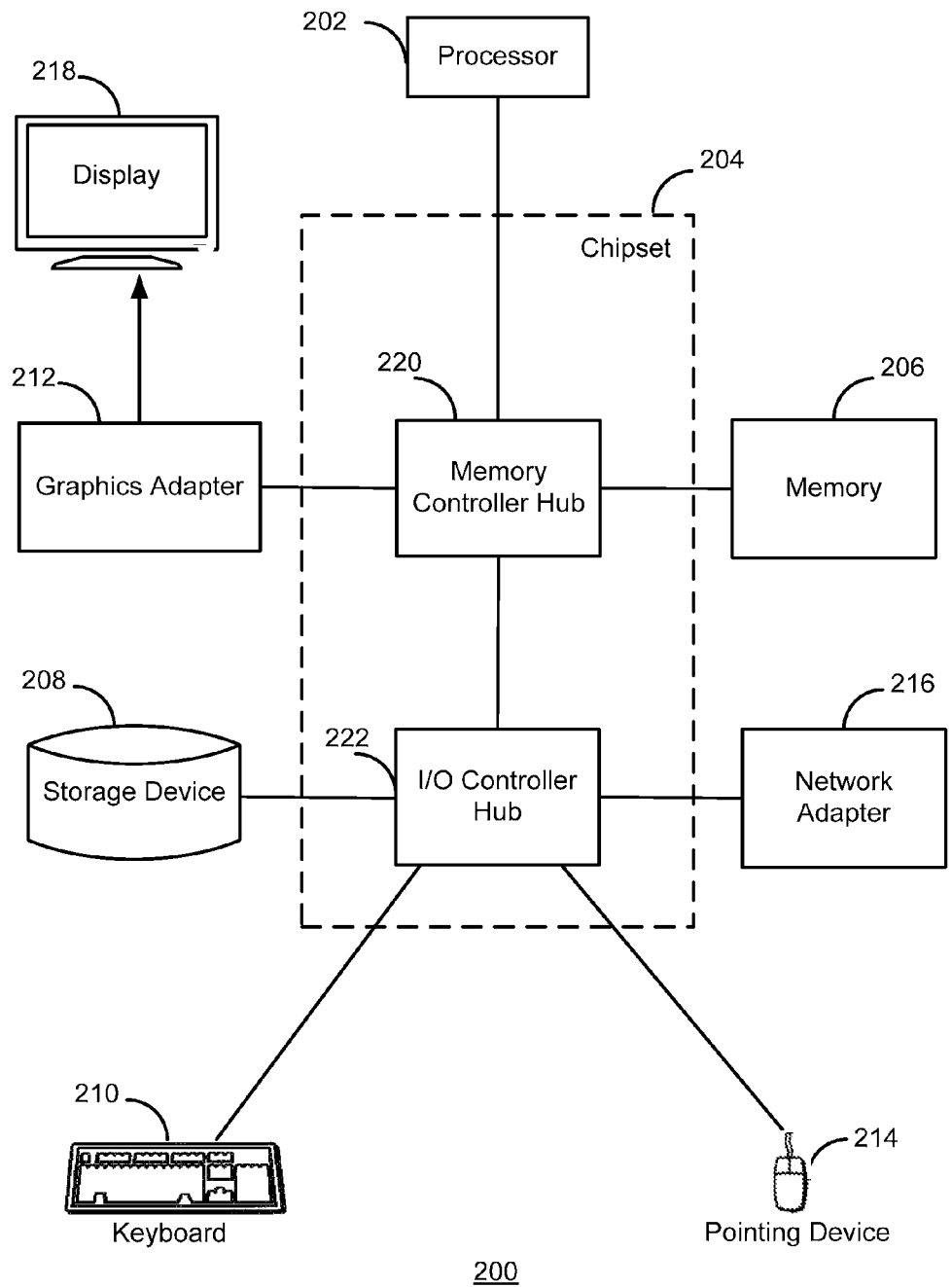
FIG. 2 is a high-level block diagram illustrating a computer system 200 for use with the present invention.

FIG. 2 is a high-level block diagram illustrating an example of a computer 200 for use as a server 116/113 and/or client 110. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 110 that is a mobile telephone typically has limited processing power, a small display 218, and might lack a pointing device 214. The server 116, in contrast, may comprise multiple blade servers working together to provide the functionality described herein.

Figure 3A:
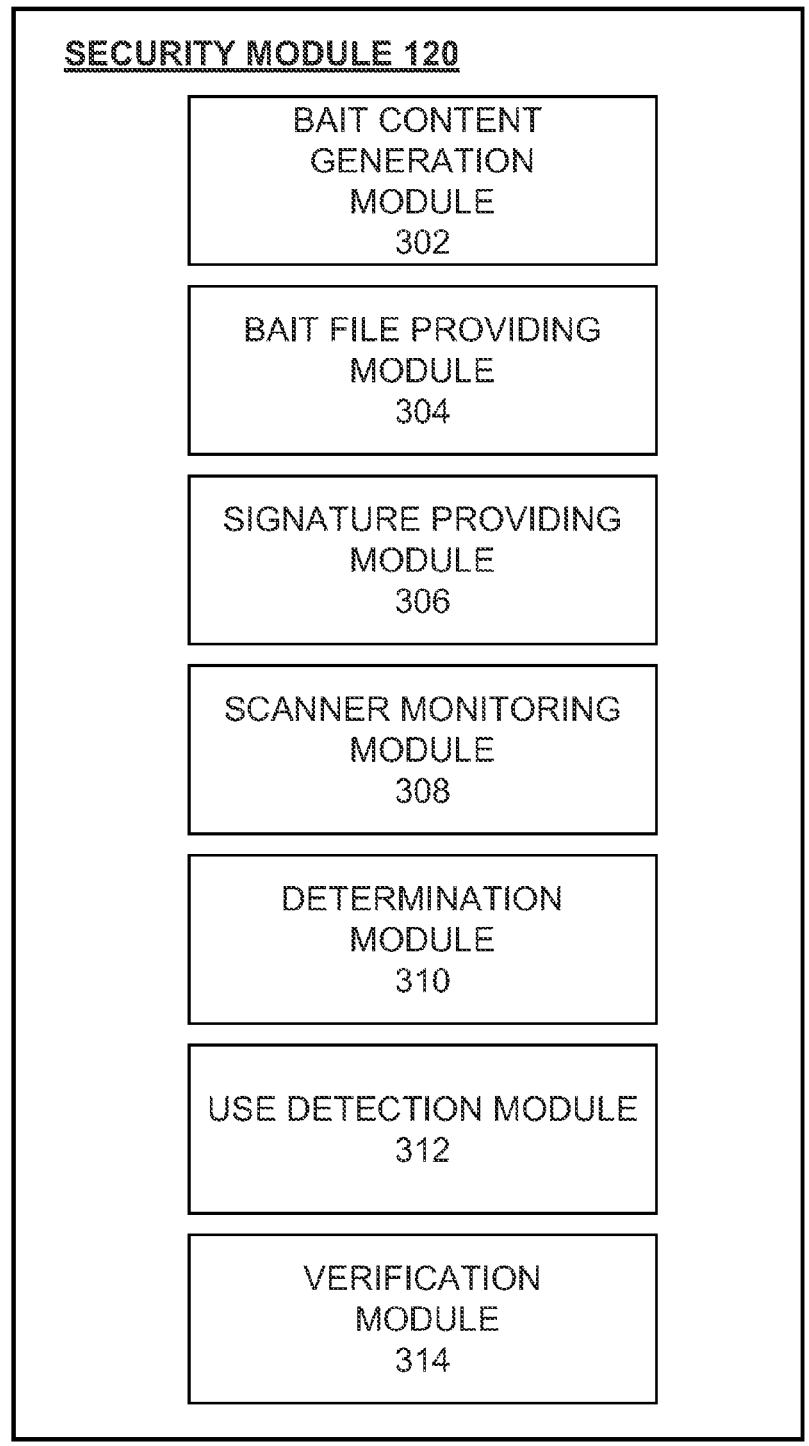
FIG. 3a is a high-level block diagram illustrating the functional modules within the security module 120, according to one embodiment of the present invention.

FIG. 3*a* is a high-level block diagram illustrating the functional modules within the security module 120, according to one embodiment of the present invention. The security module 120, in the embodiment illustrated in FIG. 3*a*, includes an optional bait content generation module 302, a bait file providing module 304, a signature providing module 306, a scanner monitoring module 308, a determination module 310, a use detection module 312, and an optional verification module 314. Some embodiments of the security module 120 have different and/or additional modules than those shown in FIG. 3*a* and the other figures. Likewise, the functionalities can be distributed among the modules in a manner different than described herein. Certain modules and functions can be incorporated into other modules of the security module 120 and/or other entities on the network 112. The same is true for FIG. 3*b*.

Figure 3B:
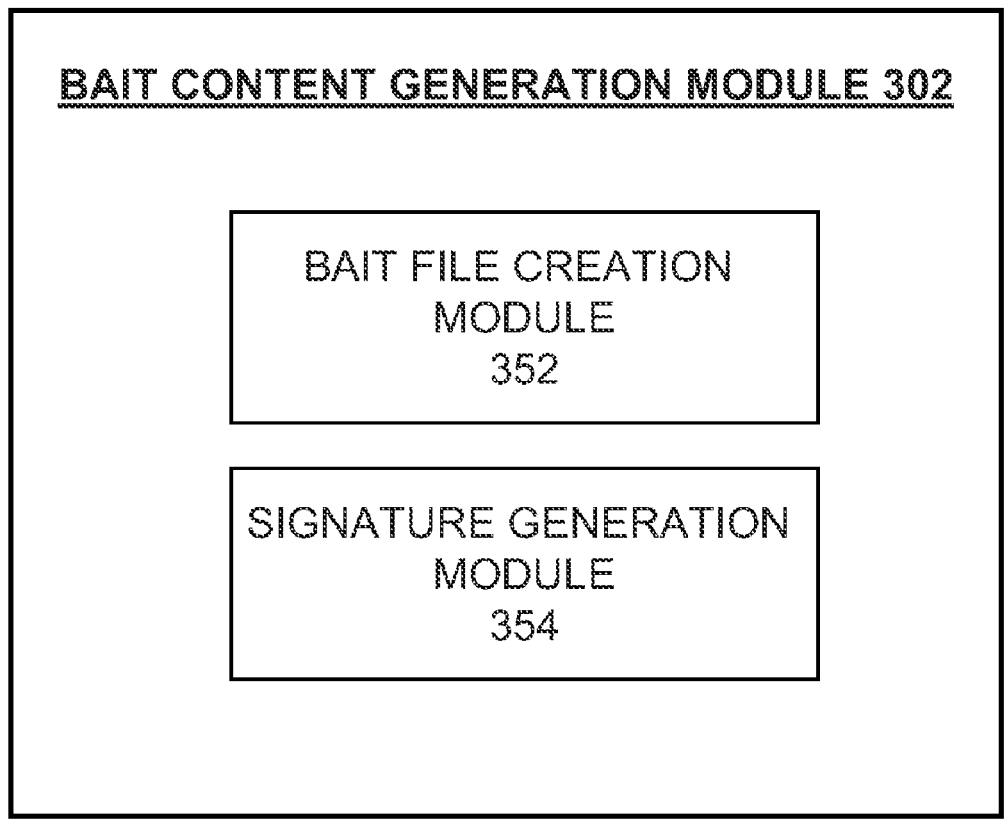
FIG. 3b is a high-level block diagram illustrating the functional modules within the bait content generation module 302 of the security module 120, according to one embodiment of the present invention.

In some embodiments, the bait content generation module 302 generates the bait content that will be used in the signature-use detection, including creating bait files and generating bait signatures for those files. FIG. 3*b* illustrates the bait content generation module 302 in more detail. The bait content generation module 302 includes a bait file creation module 352 and a signature generation module 354. Those modules of FIG. 3*b* will be described here first, followed by a description of the remaining modules of FIG. 3*a*.

The bait file creation module 352 creates a bait file that can be provided to a third party security vendor. In some embodiments, the module 352 creates multiple different bait files that are provided to the third party security vendor over a period of time. The bait file can be any type of file known by the security vendor not to contain malware. However, the third party security vendor does not know whether or not the bait file contains malware until it performs a security analysis of the file. As used herein, "malicious code" or "malware" is any code that enters a computer without an authorized user's knowledge and/or without an authorized user's consent with the intention of conducting malicious activities on the computer or on other computers.

The signature generation module 354 generates a bait signature for the bait file created by the bait file creation module 352. Where there are multiple different bait files to provide to a third party vendor, the module 354 can generate bait malware signatures for each of the multiple different bait files. The signatures generated can be stored in the signature database 111. In some embodiments, multiple bait files and bait signatures are kept stored in the database 111 for usage whenever a new bait file/signature is needed.

The signature generation module 354 can generate different kinds of signatures. The module 354 can generate bait malware signatures that can be stored in a malware signature database of the security vendor. Malware signatures are signatures for detection of malware files. Thus, a suspected malware file can be compared against malware signatures to determine if the signature is present in the file. If it is, this indicates the file likely contains malware. The module 354 can also generate bait non-malware signatures that can be stored in a non-malware signature database of the security vendor. Non-malware signatures are signatures for detection of non-malware or clean, non-infected files. Thus, a file can be compared against the non-malware signature to determine if the signature is present in the file. If it is, this indicates that the file probably does not contain malware since the signature is commonly found in non-malware files. Non-malware signatures are typically used in "whitelisting" technology in which valid programs/files are recorded and signatures or other identifiers for such programs/files are determined and stored. Instead of detecting malware, this whitelisting technology recognizes known valid programs (i.e., ones on the whitelist or matching a non-malware signature), and can be used to prevent other programs from executing, including spyware, adware, unlicensed software, or any other unauthorized application.

Returning now to FIG. 3a, the bait file providing module 304 anonymously provides a bait file to a third party security vendor for security detection. In some embodiments, the security vendor submits this bait file (e.g., a bait file created by bait file creation module 352) to the third party vendor so that the third party vendor can perform security detection on the file. The security detection can include detection of malware in the file (i.e., by detecting a match to a malware signature) or detection that the file is non-malware (i.e., by detecting a match to a non-malware signature).

The bait file providing module 304 can provide the bait file to the third party vendor in a number of ways. In one embodiment, the module 304 submits the bait file to the third party security vendor through a file submission process in which suspicious files detected on a client 110 are submitted by those clients 110 to the third party vendor for security analysis of the files. Since the security vendor is submitting the bait file anonymously, the third party vendor believes it to be a typical submission from a client 110 for security analysis. The bait file can also be provided to the third party vendor in a number of other ways, including by email (e.g., using an anonymous or disguised address), by text message, by posting the file information on a suspected file list available to the vendor, or via any other anonymous mechanism for providing or otherwise making available files for security analysis to security software vendors.

In some embodiments, the bait file providing module 304 also determines which third party security vendors should be provided with bait files. In making this determination, the module 304 can determine whether a given third party security vendor is suspected of possible use of the security vendor's signatures. If so, the module 304 can determine that this vendor should be tested by providing the vendor with a bait file. In one embodiment, the module 350 detects suspected third party vendors by monitoring requests for the security vendor's signatures over a period of time, and determining whether any of the requests originated from a third party security vendor. For example, the module 350 can monitor which Uniform Resource Locators (URLs) are requesting signatures from the security vendor, and can determine whether any of the URLs are associated with a third party security vendor. If this monitoring points to a particular third party security vendor (and particularly if it points to the vendor multiple times or many times in a short time period), that vendor is then suspected of performing an unauthorized use of the security vendor's signatures. For example, a vendor making requests multiple times a day may be deemed suspicious, so this vendor can be examined in more detail to see if it is stealing signatures or is performing some legitimate or authorized usage. Other mechanisms can also be used for detecting suspicious third party security vendors. In some embodiments, all known third party security vendors are considered to be suspected vendors, and so bait files are provided to any or all known vendors.

The signature providing module 306 provides a bait signature corresponding to the bait file that can be included in a signature database of the security vendor which is made publicly available. As explained above, the bait signature can be a bait malware signature for detecting malware in the bait file, or it can be a bait non-malware signature for detecting the bait file to be non-malware. The module 306 can provide the bait signature by publicly releasing it or otherwise making it generally available for usage with the security vendor's products. Thought it is made publicly available for usage by authorized users with the security vendor's own products (i.e., users who are properly licensing the use of the products from the security vendor), it should not be used by other third party security vendors who are not authorized to use it or are not authorized to use the security vendor's products.

The scanner monitoring module 308 monitors security detections made over a period of time by a security scanner operated by the third party security vendor. The module 308 is thus monitoring to see if the third party vendor determines the bait file to be malware or non-malware. Since the security vendor knows that the bait file is a non-malware file (e.g., such as one created by the bait file creation module 352), the security vendor knows that the file should not be detected to be malware by the third party vendor.

In some embodiments, the scanner monitoring module 308 monitors the detections by the third party vendor's scanner at two different times. The module 308 can perform a first monitoring of the detections soon after or immediately after the bait file is provided by the bait file providing module 304 to the third party vendor, but before the signature providing module 306 provided any bait signatures. The module 308 can also perform a second monitoring of the detections after the signature providing module 306 provided the bait signature. With the first monitoring, the security vendor can confirm the proper operation of third party vendor's security detection analysis system. If the third party vendor does not detect the bait file to be malware, the system is operating correctly. Thus, if in the second monitoring, after provision of the bait signature, that third party vendor now detects the bait file as malware (or now affirmatively determines it to be non-malware after making no detection in the first monitoring), the third party vendor likely used the security vendor's bait signature (so may be generally using the security vendor's signatures without authorization). In other words, the third party vendor is especially suspicious if it first finds the bait file to be clean, and then, after the bait signature is made available, suddenly finds the bait file to be malicious. On the other hand, if the third party vendor detects the bait file to be malware during the first monitoring, then this is a false result by the third party vendor's system indicating the system may be flawed and may need to be tested with a different bait file. In this case, even if the third party vendor detects the bait file during the second monitoring, this result does not necessarily indicate usage of the security vendor's signatures since the third party vendor also made a detection during the first monitoring. In other embodiments, the module 308 only performs the second monitoring of detections after the bait signature is provided, and performs no first monitoring step.

The scanner monitoring module 308 can perform the monitoring in a number of ways. In one embodiment, the module 308 uses the security product of the third party vendor, if available (i.e., to perform competitive testing), to determine whether or not the product detects the bait file. If it detects the bait file in the second monitoring, then the third party vendor has likely updated its signatures used with its product to include the bait signature. In other embodiments, the module 308 can perform the monitoring by reviewing signatures, if possible, for the third party vendor's product to determine if the bait signature is included. The module 308 can also determine if the third party vendor has announced or otherwise made known (e.g., on the third party vendor's website or elsewhere) that the bait file has been detected as malware or as non-malware. Various other mechanisms can be used, as well. Each of the first and second monitoring can occur over a defined period of time, such as 1 day, 3 days, 5 days, 10 days, 1 month, 2 months, etc.

The determination module 310 determines, based on the monitoring by the scanner monitoring module 308, whether the scanner operated by the third party security vendor positively detected the bait file following the release of the bait signature for the bait file. Where the bait signature is a bait malware signature, the module 310 detects whether the third party security vendor detected the bait file to be malware, and thus must have used the bait malware signature. Where the bait signature is a bait non-malware signature, the module 310 detects whether the third party security vendor detected the bait file to be non-malware, and thus used the bait non-malware signature. The module 310 can make the detection using the same mechanisms used by the monitoring module 308 for monitoring for detections (e.g., using the third party vendor's security product, reviewing signatures, looking for announcements, and other similar methods).

The use detection module 312 detects that the third party security vendor used the bait signature provided to detect the bait file in response to a positive determination by determination module 308. If the module 308 determines that the third party vendor has made a detection of the bait file, the module 312 detects that the vendor likely used the bait signature.

The use detection module 312 can detect both authorized and unauthorized usage of signatures. With an unauthorized use, the module 312 detects that the third party vendor has performed an unauthorized use of the security vendor's signatures, either malware signatures or non-malware signatures. For example, licensed users/vendors of the security vendor's products are authorized to use the security vendor's products for security management and to use the security vendor's signatures. Some additional usage by unlicensed users may be permissible. For example, third party vendors may occasionally use another vendor's security products in competitive testing. However, blatant stealing of another vendor's signatures or products to use as your own is an unauthorized usage that security vendors would like to be able to track. The use detection module 312 can detect this sort of unauthorized use. The use detection module 312 can also detect authorized uses of the security vendor's signatures. For example, security vendors may wish to track the authorized usage of their products/signatures to protect their brand name from potential damage by improper use of their products. Thus, the third party vendor may be an authorized user of the security vendor's signatures with the security vendor's security product. In this case, the security vendor can apply the positive determination to confirm that the third party security vendor is correctly using the security vendor's security product by regularly updating the signatures of the security product with new signatures (i.e., the bait signature) provided by the security vendor.

The use detection module 312 can also detect that the third party security vendor did not use the bait signature in a security detection process performed by the third party security vendor regarding the bait file. This detection can be made in response to a negative determination by determination module 310. For example, if the third party vendor does not detect the bait file to be malware after the release of a bait malware signature, the module 312 can determine that the vendor did not use the bait signature.

The verification module 314 verifies that the third party security vendor is using the security vendor's signatures. Various verification methods can be used. In one embodiment, the verification module 314 monitors requests for the security vendor's signatures over a period of time, and determines whether any of the requests originated from the third party security vendor. In this manner, the module 314 can verify that the vendor at least had access or attempted to get access to the signatures. The module 314 can perform this monitoring of requests in the same manner as described above regarding monitoring signature requests to determine which third party vendor are suspicious. For example, the module 314 can monitor which URLs are requesting signatures from the security vendor, and can determine whether any of the URLs are associated with a third party security vendor. If this monitoring points to a particular third party security vendor, then this adds to the suspicion that the vendor may be performing an unauthorized use of the security vendor's signatures.

In another embodiment, rather than relying on the detection of use of a single bait signature by a third party vendor, multiple detections can be performed using the multiple different bait files created. As explained above, in some embodiments, multiple different bait files are provided to a third party vendor over a period of time. Thus, the verification module 314 can manage the repeating of each of the steps with a different bait file to statistically verify that the third party vendor really is using the security vendor's signatures. For example, there can be a threshold number of uses, above which the third party vendor is suspected of blatant theft of signatures. The verification module 314 can determine when this threshold number of bait files has been detected with bait signatures by the third party security vendor. As one example, the module 314 can verify improper or unauthorized signature usage after the third party security vendor has made detections of 5, 10, 20, 50 100, 500, or 1000 bait files over a period of time. The proper threshold number for determining signature usage can be determined and adjusted as signature uses are made. Thus, the threshold number can be set to the number of detections that should occur to confirm that the third party vendor is or likely is using the security vendor's signatures. Similarly, the module 314 can use these methods to verify a negative result indicating that the third party vendor is not using the security vendor's signatures. Other similar verification methods can also be used.

Figure 4:
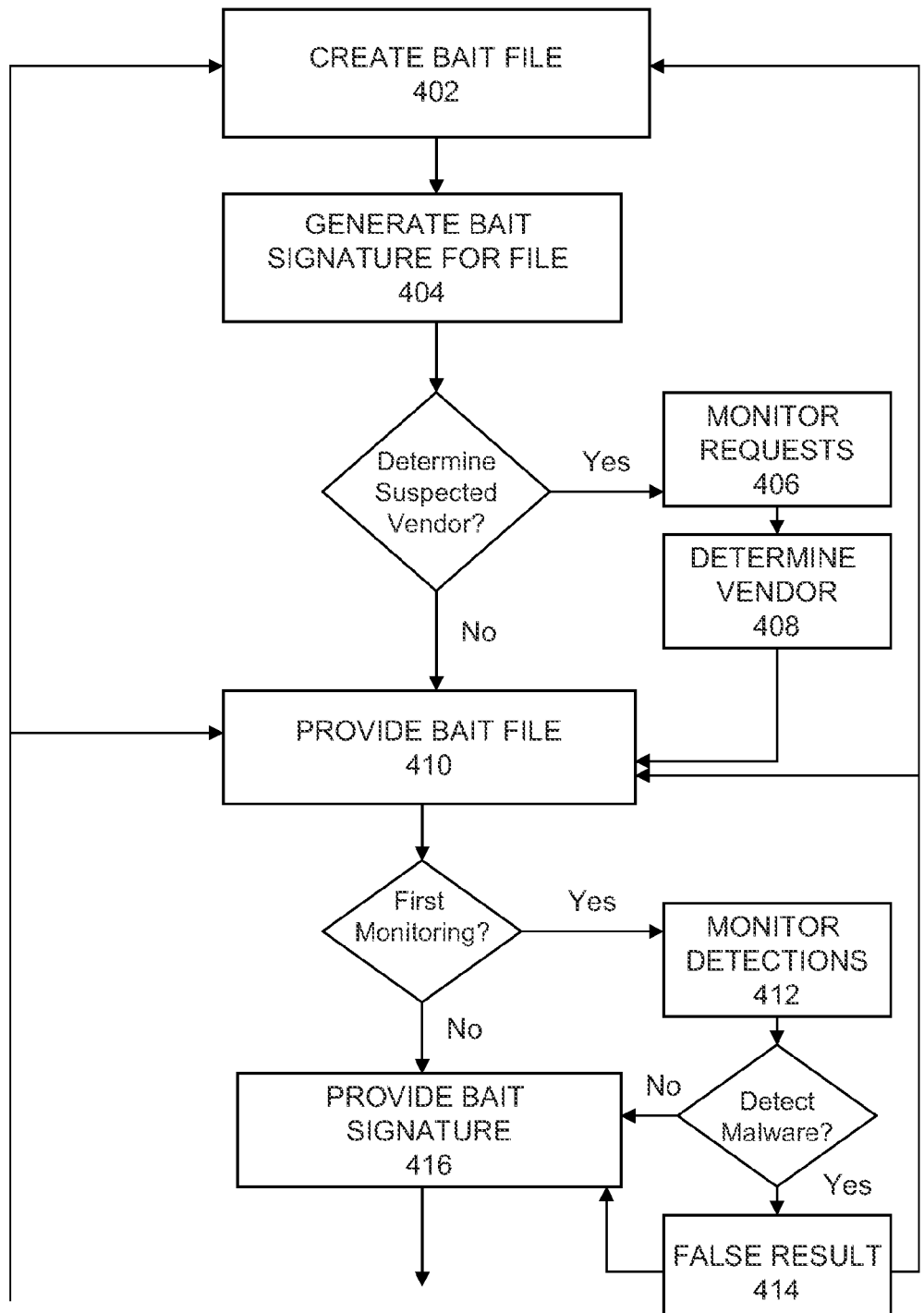
FIG. 4 is a flowchart illustrating steps performed to create and provide the bait file and bait signature to the third party security vendor, according to one embodiment of the present invention.

Referring now to FIG. 4, there is shown a flowchart illustrating the operation of the security module 120, according to some embodiments of the present invention. Specifically, FIG. 4 illustrates the steps of the security module 120 involving creating and providing the bait file and bait signature to the third party security vendor. It should be understood that these steps are illustrative only. Different embodiments of the security module 120 may perform the illustrated steps in different orders, omit certain steps, and/or perform additional steps not shown in FIG. 4 (the same is true for FIG. 5).

As shown in FIG. 4, in some embodiments, the security module 120 creates 402 a bait file that can be provided to a third party security vendor. The bait files can be created on-the-fly, as needed, or can be created in advance and stored for later usage. In some embodiments, the module 120 further generates 404 a bait signature for the bait file. The bait signature can be a malware or non-malware signature. Bait signatures for each bait file can be created on-the-fly, or they can be created in advance and stored in a signature database. In some embodiments, the method includes determining which vendors are suspected vendors to whom bait files should be sent. Where this step is not to be performed (i.e., if all vendors are considered suspicious and so can be sent bait files), the module 120 moves to the step of anonymously providing 410 a bait file to a third party vendor. Where this step is to be performed, the module 120 monitors 406 requests for the security vendor's signatures over a period of time and determines 408 whether any of the requests originated from a third party security vendor, which is then considered a suspicious vendor. The module 120 can then provide 410 a bait file to that vendor. The monitoring 406 and determining 408 steps can be performed in real-time or in advance to detect suspicious vendors. Other mechanisms for determining suspected vendors can also be used.

Once the bait file has been provided 410, in some embodiments, a first monitoring step can occur. As explained above, in some embodiments, the module 120 provides 416 the bait signature without the first monitoring step (so only the second monitoring occurs after providing the bait signature). In other embodiments, the module 120 performs a first monitoring step after the bait file is provided 410, but before the bait signature is provided 416 to see if the third party vendor detects the bait file without the signature. In this step, the module 120 monitors 412 security detections made over a period of time by a security scanner operated by the third party security vendor to see if the scanner detects the bait file. If a detection is made in response to the first monitoring, this is likely a false result 414 since the bait file was created by the security vendor and should never be positively detected to contain malware. The module 120 can then re-test the third party vendor by starting over with creating 402 a new bait file or, where a new bait file was already created, providing 410 that stored bait file. If no detection is made, then the module 120 can move to the step of providing 416 the signature.

Figure 5:
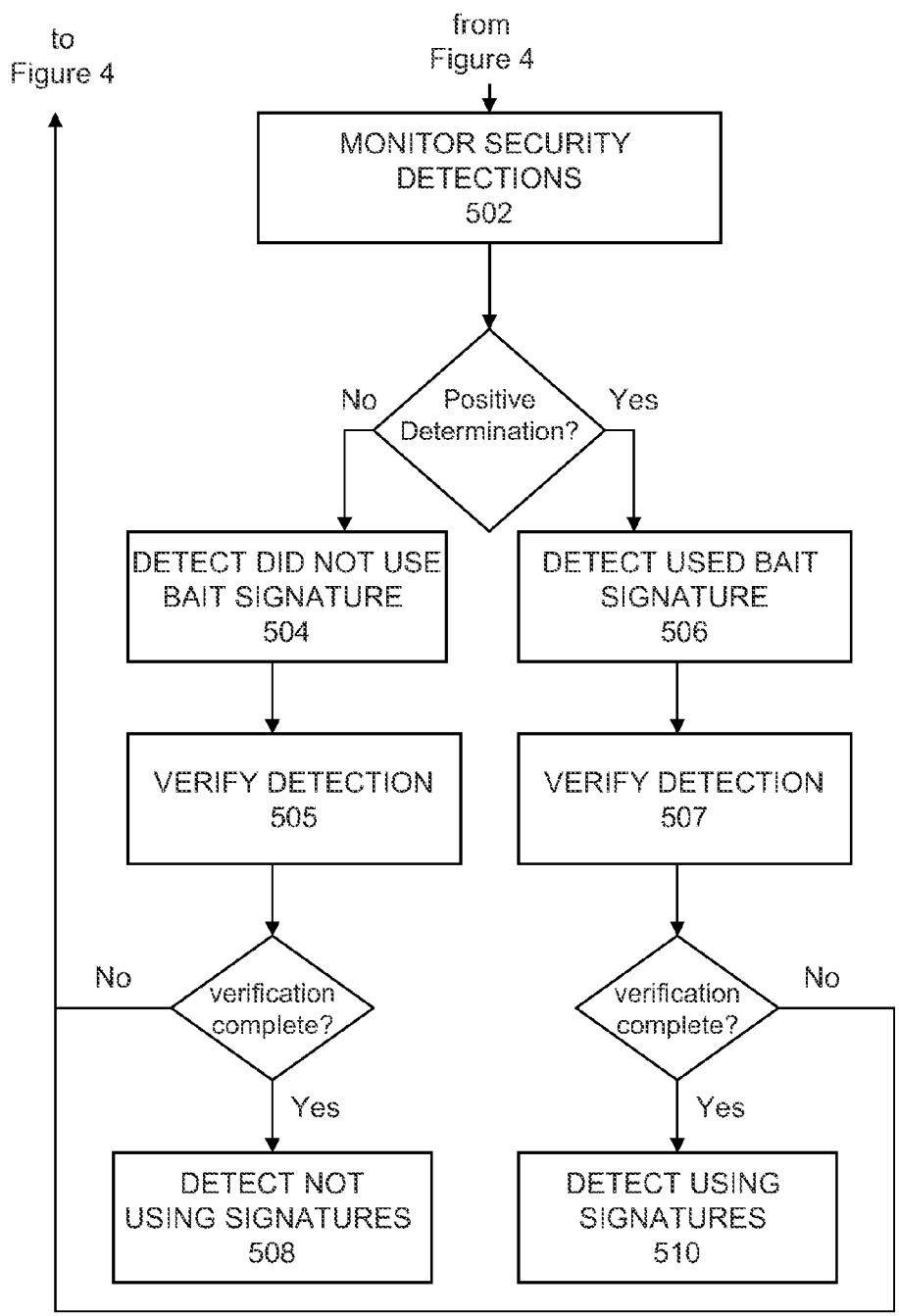
FIG. 5 is a flowchart illustrating steps performed to detect signature usage, according to one embodiment of the present invention.

Referring now to FIG. 5, there is shown a flowchart illustrating the operation of the security module 120, according to some embodiments of the present invention. Specifically, FIG. 5 illustrates the steps of the security module 120 involving detecting signature usage.

Following the provision 416 of the bait signature, the security module 120 monitors 502 security detections made over a period of time by the security scanner operated by the third party security vendor (i.e., the second monitoring step). The module 120 can then determine whether the scanner positively detected the bait file following the release of the bait signature for the bait file. Where a positive determination is made, the module 120 detects 506 that the third party security vendor used the bait signature provided to detect the bait file. Where a negative determination is made, the module 120 detects 504 that the third party security vendor did not use the bait signature in a security detection process regarding the bait file.

In some embodiments, the module 120 further verifies 507, 507 the detection to determine whether the third party vendor really is using the security vendor's signatures or really is not using the signatures, since detection of the use of one bait signature may not be sufficient. As explained above, the module can verify 505, 507 this detection by repeating each of the above-described steps with one or more additional bait files (i.e., creating 402 a new bait file or providing 410 an already created bait file from storage), each time detecting whether the vendor used the bait signature to detect the bait file. In some embodiments, the steps can be repeated multiple times until the module 120 has determined that a threshold number of positive or negative determinations has been reached and the verification 505, 507 is complete. As explained above, the module can also perform other verification 505, 507 steps in real time or in advance, including monitoring requests for the security vendor's signatures over a period of time (similar to step 406) and determining whether any of the requests originated from the third party security vendor to further verify that the vendor at least had access to the signatures (similar to step 408). Once all of the verification steps are deemed complete, the module 120 can then detect 510 that the third party vendor is using the security vendor's signatures (and may be using the security vendor's scanner as its own) or detect 508 that it is not using the signatures.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer-implemented method of detecting use of a security vendor's signatures by third party security vendors, the method comprising:

anonymously providing a bait file to a third party security vendor for security detection, the bait file being a non-malware file;

providing a bait signature corresponding to the bait file that is included in a signature database of the security vendor which is made publicly available;

monitoring security detections made over a period of time by a security scanner operated by the third party security vendor, including monitoring before and after the bait signature is provided;

determining whether the scanner operated by the third party security vendor positively detected the bait file following the release of the bait signature for the bait file; and responsive to a positive determination, detecting that the third party security vendor used the bait signature provided to detect the bait file.

2. The method of claim 1, wherein the bait signature is a bait malware signature in a malware signature database of the security vendor, and wherein detecting that the third party security vendor used the bait malware signature further comprises detecting that the third party security vendor has performed an unauthorized use of the security vendor's signatures to detect the bait file to be malware.

3. The method of claim 1, wherein the bait signature is a bait non-malware signature in a non-malware signature database of the security vendor, and wherein detecting that the third party security vendor used the bait non-malware signature further comprises detecting that the third party security vendor has performed an unauthorized use of the security vendor's signatures to detect the bait file to be non-malware.

4. The method of claim 1, wherein the use of the bait signature by the third party vendor is an authorized use of the security vendor's signatures with the security vendor's security product, and wherein the method further comprises confirming that the third party security vendor is correctly using the security vendor's security product by regularly updating the signatures of the security product with new signatures provided by the security vendor.

5. The method of claim 1, wherein the bait signature is a bait malware signature, and wherein the method further comprises:
   responsive to providing the bait file to the third party security vendor, monitoring the security scanner operated by the third party security vendor for detection of the bait file after providing the bait file to the third party security vendor but before providing the bait malware signature for the bait file; and
   determining whether the security scanner detects the bait file, wherein failure of the security scanner to detect the bait file before the providing of the bait malware signature followed by detection of the bait file after the providing of the bait malware signature further indicates that the third party entity is performing an unauthorized use of the bait malware signature.

6. The method of claim 1, further comprising:
   responsive to a negative determination, detecting that the third party security vendor did not use the bait signature in a security detection process performed by the third party security vendor regarding the bait file; and
   verifying that the third party security vendor is not using the security vendor's signatures by repeating each of the method steps with a plurality of different bait files.

7. The method of claim 1, further comprising verifying the positive determination by:
   monitoring requests for the security vendor's signatures over a period of time; and
   determining whether any of the requests originated from the third party security vendor to verify whether the third party security vendor is performing a potential unauthorized use of the security vendor's signatures.

8. A non-transitory computer-readable storage medium storing executable computer program instructions for use of a security vendor's signatures by third party security vendors, the computer program instructions comprising instructions for performing the steps comprising:
   anonymously providing a bait file to a third party security vendor for security detection, the bait file being a non-malware file;
   providing a bait signature corresponding to the bait file that is included in a signature database of the security vendor which is made publicly available;
   monitoring security detections made over a period of time by a security scanner operated by the third party security vendor, including monitoring before and after the bait signature is provided;
   determining whether the scanner operated by the third party security vendor positively detected the bait file following the release of the bait signature for the bait file; and
   responsive to a positive determination, detecting that the third party security vendor used the bait signature provided to detect the bait file.

9. The computer-readable storage medium of claim 8, wherein the bait signature is a bait malware signature in a malware signature database of the security vendor, and wherein detecting that the third party security vendor used the bait malware signature further comprises detecting that the third party security vendor has performed an unauthorized use of the security vendor's signatures to detect the bait file to be malware, wherein the third party security vendor could not have detected the bait file to be malware without using the bait malware signature.

10. The computer-readable storage medium of claim 8, wherein the bait signature is a bait non-malware signature in a non-malware signature database of the security vendor, and wherein detecting that the third party security vendor used the bait non-malware signature further comprises detecting that the third party security vendor has performed an unauthorized use of the security vendor's signatures to detect the bait file to be non-malware.

11. The computer-readable storage medium of claim 8, wherein the use of the bait signature by the third party vendor is an authorized use of the security vendor's signatures with the security vendor's security product, and wherein the method further comprises confirming that the third party security vendor is correctly using the security vendor's security product by regularly updating the signatures of the security product with new signatures provided by the security vendor.

12. The computer-readable storage medium of claim 8, further comprising:
   creating multiple different bait files;
   providing the multiple different bait files to the third party entity over a period of time;
   repeating the releasing step, the monitoring step, and the determining step for each of the multiple different bait files; and
   statistically verifying, based on the repeated steps, the use, by the third party security vendor, of the bait signatures that correspond to the multiple different bait files, wherein detection of the use of a threshold number of bait signatures indicates that the third party security vendor is performing unauthorized uses of the security vendor's signatures.

13. The computer-readable storage medium of claim 8, further comprising:
   monitoring the security scanner operated by the third party security vendor for detection of the bait file after providing the bait file to the third party security vendor but before providing the bait signature for the bait file; and
   determining whether the security scanner detects the bait file, wherein failure of the security scanner to detect the bait file before the providing of the bait signature followed by detection of the bait file after the providing of the bait signature further indicates that the third party entity is performing a potential unauthorized use of the security vendor's signatures.

14. The computer-readable storage medium of claim 8, further comprising determining whether a given third party security vendor is suspected of possible use of the security vendor's malware signatures by:
   monitoring requests for the security vendor's malware signatures over a period of time; and
   determining whether any of the requests originated from the given third party security vendor, a positive determination indicating that the third party security vendor is suspected of performing an unauthorized use of the security vendor's malware signatures.

15. A computer system for detecting use of a security vendor's signatures by third party security vendors, the system comprising:

a non-transitory computer-readable storage medium storing executable software modules, comprising:
- a bait file providing module for anonymously providing a bait file to a third party security vendor for security detection, the bait file being a non-malware file;
- a signature providing module for providing a bait signature corresponding to the bait file that is included in a signature database of the security vendor which is made publicly available;
- a scanner monitoring module for monitoring security detections made over a period of time by a security scanner operated by the third party security vendor, including monitoring before and after the bait signature is provided;
- a determination module for determining whether the scanner operated by the third party security vendor positively detected the bait file following the release of the bait signature for the bait file;
- a use detection module for detecting that the third party security vendor used the bait signature provided to detect the bait file in response to a positive determination; and
- a processor configured to execute the software modules stored by the computer readable storage medium.

16. The system of claim 15, wherein the bait signature is a bait malware signature in a malware signature database of the security vendor, and wherein detecting that the third party security vendor used the bait malware signature further comprises detecting that the third party security vendor has performed an unauthorized use of the security vendor's signatures to detect the bait file to be malware, the bait malware signature being a proprietary signature of the security vendor.

17. The system of claim 15, further comprising a verification module for verifying that the third party security vendor is using the security vendor's signatures by repeating each of the method steps with a different bait file and by:
- monitoring requests for the security vendor's signatures over a period of time; and
- determining whether any of the requests originated from the third party security vendor to verify whether the third party security vendor is performing an unauthorized use of the security vendor's signatures.

18. The system of claim 15, further comprising:
- a bait file creation module for creating multiple different bait files that are provided to the third party security vendor;
- a signature generation module for generating bait malware signatures for each of the multiple different bait files that are provided in the signature database of the security vendor; and
- a verification module for verifying the detection by the use detection module by verifying that the third party security vendor used the bait malware signatures provided to detect each of the corresponding bait files, wherein detection of the use of a threshold number of bait malware signatures indicates that the third party security vendor is performing unauthorized uses of the security vendor's signatures.

19. The system of claim 18, wherein the use detection module is further configured for detecting, in response to meeting the threshold number of uses of bait malware signatures, that the third party security vendor is utilizing a security scanner of the security vendor as its own security scanner to perform detections of malware.

20. The system of claim 15, further comprising:
- the scanner monitoring module for monitoring the security scanner operated by the third party security vendor for detection of the bait file after providing the bait file to the third party security vendor but before providing the bait signature for the bait file; and
- the use detection module for determining whether the security scanner detects the bait file, wherein failure of the security scanner to detect the bait file before the providing of the bait signature followed by detection of the bait file after the providing of the bait signature further indicates that the third party entity is performing an unauthorized use of the security vendor's signatures.

* * * * *